(12) United States Patent
Chang et al.

(10) Patent No.: US 11,274,911 B1
(45) Date of Patent: Mar. 15, 2022

(54) CABLE DIAMETER AND BEND RADIUS QUICK MEASURING TOOL

(71) Applicant: Quanta Computer Inc., Taoyuan (TW)

(72) Inventors: Chun Chang, Taoyuan (TW); Chen Tseng, Taoyuan (TW); Cheng-Hsiang Huang, Taoyuan (TW); Chih-Hung Yang, Taoyuan (TW); I-Hui Chen, Taoyuan (TW)

(73) Assignee: QUANTA COMPUTER INC., Taoyuan (TW)

( * ) Notice: Subject to any disclaimer, the term of this patent is extended or adjusted under 35 U.S.C. 154(b) by 0 days.

(21) Appl. No.: 17/014,390

(22) Filed: Sep. 8, 2020

(51) Int. Cl.
  *G01B 3/34* (2006.01)
  *G01B 3/42* (2006.01)
  *G01B 3/14* (2006.01)
  *G01B 5/08* (2006.01)
  *G01B 5/213* (2006.01)

(52) U.S. Cl.
  CPC ............... *G01B 3/42* (2013.01); *G01B 3/14* (2013.01); *G01B 5/08* (2013.01); *G01B 5/213* (2013.01)

(58) Field of Classification Search
  CPC .................................. G01B 3/42; G01B 5/08
  USPC .................... 33/555.1, 555.2, 555.3
  See application file for complete search history.

(56) References Cited

U.S. PATENT DOCUMENTS

| | | | | |
|---|---|---|---|---|
| 5,501,020 A | * | 3/1996 | Welt | B23B 51/00 33/555.2 |
| 5,685,085 A | * | 11/1997 | Bond | G01B 3/42 33/520 |
| 7,607,237 B2 | * | 10/2009 | Schafer | G01B 3/34 33/501.45 |
| 7,984,850 B2 | * | 7/2011 | Santos | G01B 3/34 235/380 |
| 9,347,760 B2 | * | 5/2016 | Thorley | G01B 5/18 |
| 10,288,400 B2 | * | 5/2019 | Johnson | G01B 3/20 |
| 10,935,358 B2 | * | 3/2021 | Ilicic | G01B 3/34 |
| 2001/0011421 A1 | * | 8/2001 | Bakke | G01B 3/34 33/501.45 |
| 2005/0160611 A1 | * | 7/2005 | Nave | G01B 3/42 33/501.45 |
| 2010/0186250 A1 | * | 7/2010 | Hu | G01B 3/166 33/807 |
| 2020/0232775 A1 | * | 7/2020 | Komarinski | H02G 1/00 |
| 2020/0249005 A1 | * | 8/2020 | Crockett | B25H 7/00 |

* cited by examiner

*Primary Examiner* — George B Bennett
(74) *Attorney, Agent, or Firm* — Nixon Peabody LLP

(57) ABSTRACT

A cable measuring tool includes a first end portion and a second end portion. The first end portion includes a first rounded edge and a cutaway. The cutaway is configured to fit at least a half of a cable having a maximum diameter. The first rounded edge has a radius greater than the maximum diameter of the cable. The second end portion is opposite from the first end portion. The second end portion includes a second edge. The first rounded edge of the first end portion and the second edge of the second end portion define a length of the cable measuring tool.

20 Claims, 4 Drawing Sheets

CABLE DIAMETER AND BEND RADIUS QUICK MEASURING TOOL

TECHNICAL FIELD

This disclosure relates generally to cable management, and more particularly, to cable management tools for measuring cable diameter and bend radius.

BACKGROUND

For a server system assembly in a production line, standard operating procedures (SOPs) are followed, which may include a specified minimum bend radius for a given cable. However, due to space limitations and/or human factors, some cables in the server system assembly may not comply with the specified minimum bend radius required by SOPs (i.e., the bend radius of the cables is too small). Thus, a need exists for a measuring tool that can quickly inspect the bend radius for a given cable. The present disclosure is directed to solving these problems.

SUMMARY

According to some implementations of the present disclosure, a cable measuring tool includes a first end portion and a second end portion. The first end portion includes a first rounded edge and a cutaway. The cutaway is configured to fit at least a half of a cable having a maximum diameter. The first rounded edge has a radius greater than the maximum diameter of the cable. The second end portion is opposite from the first end portion. The second end portion includes a second edge. The first rounded edge of the first end portion and the second edge of the second end portion define a length of the cable measuring tool.

In some implementations, the cutaway is oblong-shaped. In some implementations, the cutaway is shaped as a half ellipse. In some implementations, the cutaway includes a minor axis, which has a length that is about the same as the maximum diameter of the cable. In some implementations, the radius of the first rounded edge is between twice and three times that of the maximum diameter of the cable. In some implementations, the radius of the first rounded edge is about 2.5 times that of the maximum diameter of the cable. In some implementations, the length of the cable measuring tool is between 15 cm to 16 cm.

According to some implementations of the present disclosure, a tool assembly includes a plurality of cable measuring tools. Each cable measuring tool of the plurality of cable measuring tools includes a first end portion and a second end portion. The first end portion includes a first rounded edge and a cutaway. The cutaway includes a minor axis. The first rounded edge has a radius that is greater than a length of the minor axis of the cutaway. The second end portion is opposite from the first end portion. The second end portion includes a second edge. The first rounded edge of the first end portion and the second edge of the second end portion define a length of the cable measuring tool.

In some implementations, the cutaway of each cable measuring tool is configured to fit at least a half of a cable having a maximum diameter. The length of the minor axis of the cutaway is about the same as the maximum diameter of the cable. In some implementations, the radius of the first rounded edge of each cable measuring tool is between twice and three times that of the length of the minor axis of the cutaway. In some implementations, the radius of the first rounded edge of each cable measuring tool is about 2.5 times that of the length of the minor axis of the cutaway.

In some implementations, the second end portion of each cable measuring tool further includes an aperture, such that the plurality of cable measuring tools is configured to be held together via the aperture of each cable measuring tool.

In some implementations, each cable measuring tool of the plurality of cable measuring tools has a different minor axis. In some implementations, the length of the minor axis of a first cable measuring tool of the plurality of cable measuring tools is 0.5 mm or 1 mm less than the length of the minor axis of a second cable measuring tool of the plurality of cable measuring tools.

In some implementations, the length of the minor axis of a first cable measuring tool of the plurality of cable measuring tools is about 3.5 mm, 4 mm, 4.5 mm, 5 mm, 6.5 mm, 7 mm, 7.5 mm, 8 mm, 8.5 mm, 9 mm, 9.5 mm, 10 mm, 10.5 mm, 11 mm, 12 mm, 13 mm, 14 mm, or 15 mm. In some implementations, the length of the minor axis of a second cable measuring tool of the plurality of cable measuring tools is about 4 mm, 4.5 mm, 5 mm, 6.5 mm, 7 mm, 7.5 mm, 8 mm, 8.5 mm, 9 mm, 9.5 mm, 10 mm, 10.5 mm, 11 mm, 12 mm, 13 mm, 14 mm, 15 mm, or 16 mm.

According to some implementations of the present disclosure, a method for verifying a bend radius of a cable using a plurality of cable measuring tools is disclosed. Each cable measuring tool of the plurality of cable measuring tools includes a first end portion, which has a rounded edge and a cutaway. The cutaway includes a minor axis. The rounded edge has a radius that is greater than a length of the minor axis of the cutaway. Each minor axis of the cutaway of the plurality of cable measuring tools has a different length. A first cable measuring tool is selected from the plurality of cable measuring tools. The first cable measuring tool fits at least half of the cable within the cutaway of the first cable measuring tool. The rounded edge of the first cable measuring tool is aligned with a bent portion of the cable. The radius of the rounded edge of the first cable measuring tool is compared with the bend radius of the bent portion of the cable.

In some implementations, the bend radius is determined to have passed verification if the radius of the rounded edge of the first cable measuring tool is greater than the bend radius of the bent portion of the cable. In some implementations, the bend radius is determined to have failed verification if the radius of the rounded edge of the first cable measuring tool is less than the bend radius of the bent portion of the cable In some implementations, the first cable measuring tool has the shortest minor axis among one or more cable measuring tools of the plurality cable measuring tools. In some implementations, each of the one or more cable measuring tools fits the at least half of the cable within the corresponding cutaway of each of the one or more cable measuring tools.

The above summary is not intended to represent each embodiment or every aspect of the present disclosure. Rather, the foregoing summary merely provides an example of some of the novel aspects and features set forth herein. The above features and advantages, and other features and advantages of the present disclosure, will be readily apparent from the following detailed description of representative embodiments and modes for carrying out the present invention, when taken in connection with the accompanying drawings and the appended claims.

BRIEF DESCRIPTION OF THE DRAWINGS

The foregoing and other advantages of the present disclosure will become apparent upon reading the following detailed description and upon reference to the drawings.

Figure 1:
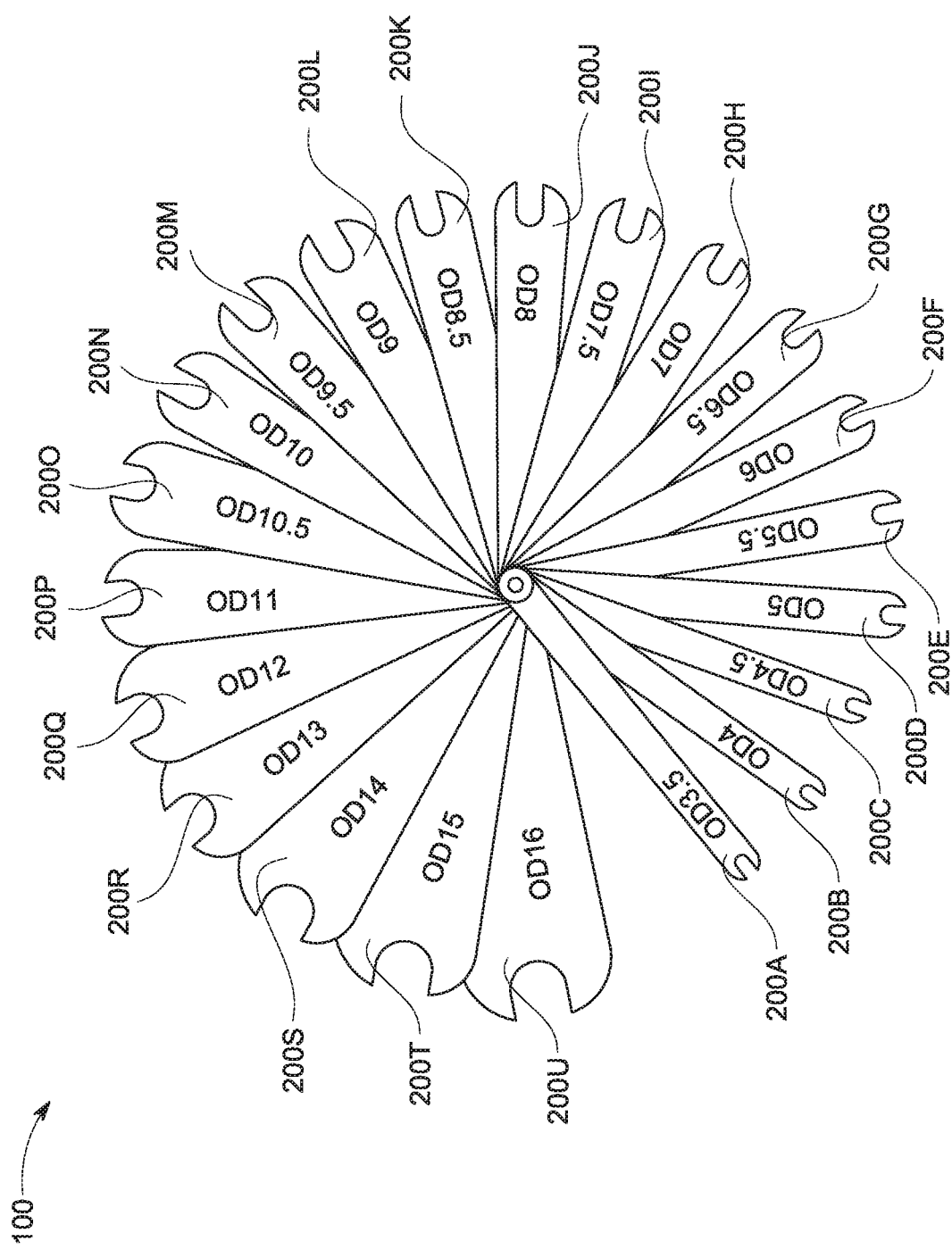
FIG. 1 depicts a tool assembly, according to some implementations of the present disclosure.

While the present disclosure is susceptible to various modifications and alternative forms, specific implementations have been shown by way of example in the drawings and will be described in further detail herein. It should be understood, however, that the present disclosure is not intended to be limited to the particular forms disclosed. Rather, the present disclosure is to cover all modifications, equivalents, and alternatives falling within the spirit and scope of the present disclosure as defined by the appended claims.

DETAILED DESCRIPTION

The present disclosure is described with reference to the attached figures, where like reference numerals are used throughout the figures to designate similar or equivalent elements. The figures are not drawn to scale and are provided merely to illustrate the instant disclosure. Several aspects of the disclosure are described below with reference to example applications for illustration. It should be understood that numerous specific details, relationships, and methods are set forth to provide a full understanding of the invention. One having ordinary skill in the relevant art, however, will readily recognize that the invention can be practiced without one or more of the specific details, or with other methods. In other instances, well-known structures or operations are not shown in detail to avoid obscuring the invention. The present invention is not limited by the illustrated ordering of acts or events, as some acts may occur in different orders and/or concurrently with other acts or events. Furthermore, not all illustrated acts or events are required to implement a methodology in accordance with the present invention.

The present disclosure relates to a cable measuring tool that can quickly measure a cable diameter and its bend radius. The cable measuring tool can be used to inspect the bend radius for a cable having a particular outside dimension (e.g., diameter), thereby improving human operation when assembling the cables.

Referring to FIG. 1, an example tool assembly 100 including a plurality of cable measuring tools is depicted. As shown in this example, the tool assembly 100 can include 21 cable measuring tools: 200A, 200B, 200C, 200D, 200E, 200F, 200G, 200H, 200I, 200J, 200K, 200L, 200M, 200N, 200O, 200P, 200Q, 200R, 200S, 200T, and 200U. Although there are 21 cable measuring tools 200A-200U shown in FIG. 1 that can accommodate common cable diameters, the tool assembly 100 can have more or fewer cable measuring tools.

Figure 2:
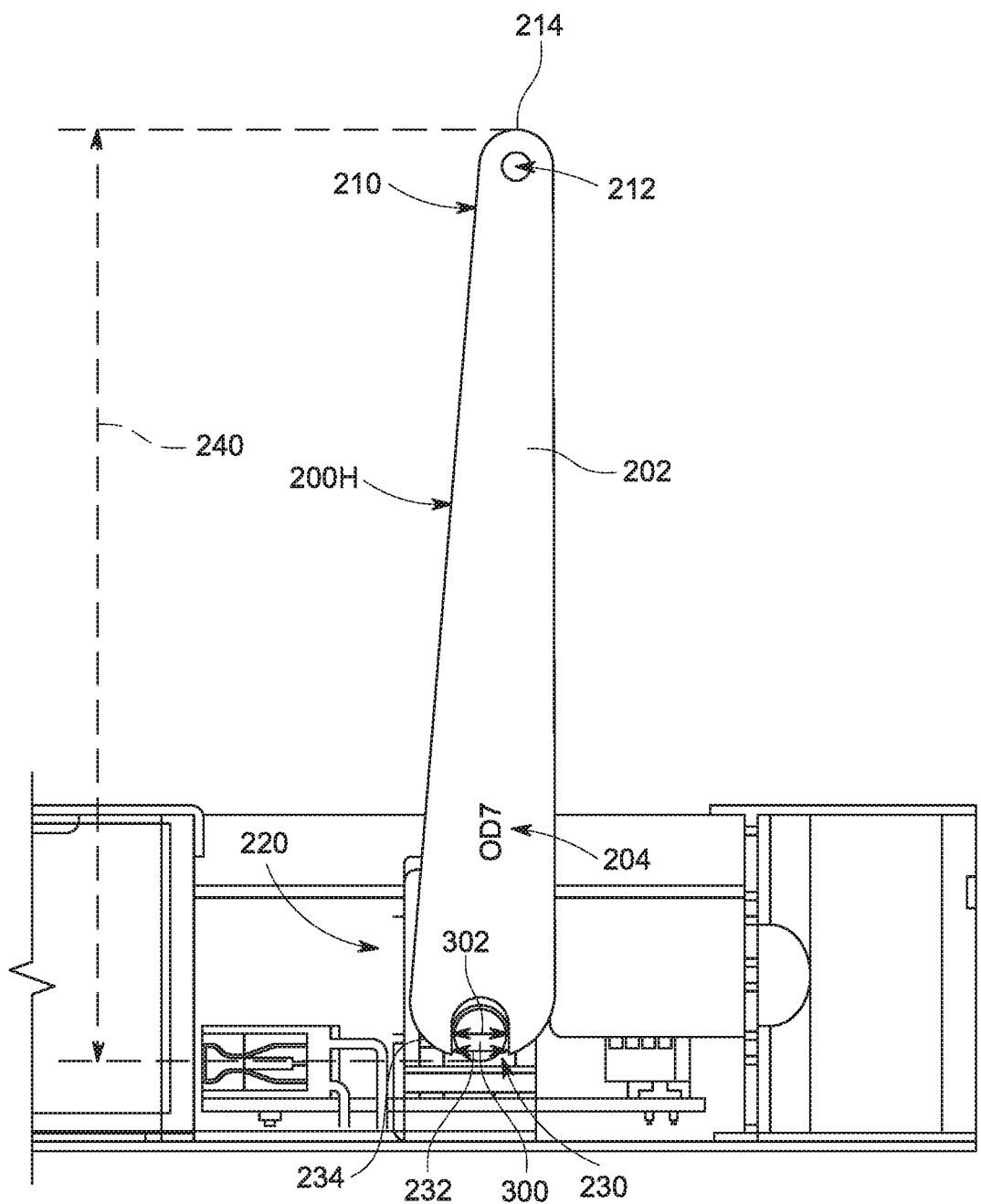
FIG. 2 depicts an example cable measuring tool of the tool assembly of FIG. 1, according to some implementations of the present disclosure.

Referring to FIG. 2, the cable measuring tool 200H is depicted. The example cable measuring tool 200H can be made of any suitable material that maintains its rigidity. The cable measuring tool 200H, in this example, is about 0.5-3.0 mm thick. In some implementations, the cable measuring tool 200H can be made of a polyester film made from stretched polyethylene terephthalate (PET), which can be used for its high tensile strength, chemical and dimensional stability, transparency, reflectivity, gas and aroma barrier properties, and electrical insulation. For example, in some such implementations, the cable measuring tool 200H is made of biaxially-oriented polyethylene terephthalate (Bo-PET). Preferably, the cable measuring tool 200H is about 1 mm thick. In some implementations, each cable measuring tool 200A-200U of the tool assembly 100 (FIG. 1) is about the same thickness, such as 1 mm. Each of the other cable measuring tools 200A-200U are in the same general shape as the cable measuring tool 200H.

Still referring to FIG. 2, the cable measuring tool 200H has a tapered body that includes a first end portion 220 and a second end portion 210. The first end portion 220 includes a first rounded edge 234 and an oblong cutaway 230. The second end portion 210 is located opposite from the first end portion 220. The second end portion 210 includes a second rounded edge 214. The distance between the first rounded edge 234 of the first end portion 220 and the second rounded edge 214 of the second end portion 210 define a length 240 of the cable measuring tool 200H. For example, the length of the cable measuring tool can be between about 15 cm to about 16 cm.

In some implementations, the oblong cutaway 230 is shaped as a half ellipse. Although it is shown in FIG. 2 that the oblong cutaway 230 is an oblong shape, the cutaway 230 for the cable measuring tool 200H can be of any suitable shape, such as a circle or a semi-circle. The oblong cutaway 230 is configured to fit and/or accommodate at least a half of a cable 300 having a maximum diameter 302. Additionally or alternatively, the oblong cutaway 230 is configured to fit and/or accommodate at least a circular cross-section of a cable having the maximum diameter 302. In this example, the oblong cutaway 230 accommodates nearly the entire cable 300. As shown, the oblong cutaway 230 includes a minor axis 232, which has a length that is about the same as the maximum diameter 302 of the cable 300, or slightly larger.

The first rounded edge 234 has a radius that is greater than the length of the minor axis 232 of the oblong cutaway 230. For example, in some implementations, the radius of the first rounded edge 234 is between twice and three times the length of the minor axis 232 of the oblong cutaway 230. Preferably, the radius of the first rounded edge 234 is about 2.5 times the length of the minor axis 232 of the oblong cutaway 230. Furthermore, the body 202 of the cable measuring tool 200H has a graphic 204—"OD7," which indicates the cable measuring tool 200H is configured to fit and/or accommodate a cable that has a maximum diameter of up to 7 mm (e.g., the cable 300).

Referring back to FIG. 1, in some implementations, each cable measuring tool 200A-200U further includes an aperture spaced at a distance from the second edge. The cable measuring tools 200A-200U are configured to be held together, via a pin or other holder inserted through the apertures. For example, as shown in FIG. 2, the second end portion 210 of the cable measuring tool 200H includes the aperture 212 that is spaced from the second rounded edge 214. In some implementations, each cable measuring tool 200A-200U is independently removable.

Furthermore, each cable measuring tool 200A-200U generally includes the same, or similar components as the example cable measuring tool 200H as shown in FIG. 2, except that each cable measuring tool 200A-200U is sized differently from one another. In some implementations, corresponding minor axes of adjacently sized cable measuring tools is between 0.1 mm and 2 mm different from each other. Preferably, corresponding minor axes of adjacently sized cable measuring tools is about 0.5 mm or about 1 mm different from each other.

For example, as shown in FIG. 1, the minor axes of the cable measuring tools 200A, 200B, 200C, 200D, 200E, 200F, 200G, 200H, 200I, 200J, 200K, 200L, 200M, 200N, 200O, 200P, 200Q, 200R, 200S, 200T, and 200U are about 3.5 mm, 4 mm, 4.5 mm, 5 mm, 6.5 mm, 7 mm, 7.5 mm, 8 mm, 8.5 mm, 9 mm, 9.5 mm, 10 mm, 10.5 mm, 11 mm, 12 mm, 13 mm, 14 mm, 15 mm, and 16 mm, respectively.

Thus, in some such implementations, the cable measuring tools 200A, 200B, 200C, 200D, 200E, 200F, 200G, 200H, 200I, 200J, 200K, 200L, 200M, 200N, 200O, 200P, 200Q, 200R, 200S, 200T, and 200U may be configured to fit cables that have a maximum diameter of or up to about 3.5 mm, 4 mm, 4.5 mm, 5 mm, 6.5 mm, 7 mm, 7.5 mm, 8 mm, 8.5 mm, 9 mm, 9.5 mm, 10 mm, 10.5 mm, 11 mm, 12 mm, 13 mm, 14 mm, 15 mm, and 16 mm, respectively.

Furthermore, as shown, the cable measuring tools 200A, 200B, 200C, 200D, 200E, 200F, 200G, 200H, 200I, 200J, 200K, 200L, 200M, 200N, 200O, 200P, 200Q, 200R, 200S, 200T, and 200U have the graphics "OD3.5," "OD4," "OD4.5," "OD5," "OD5.5," "OD6," "OD6.5," "OD7," "OD7.5," "OD8," "OD8.5," "OD9," "OD9.5," "OD10," "OD10.5," "OD11," "OD12," "OD13," "OD14," "OD15," and "OD16" labeled on their bodies. These graphics correspond to the outside diameter of the cables that the cable measuring tools are configured to fit and/or accommodate.

Referring back to FIG. 2, the cable measuring tool 200H can be used to verify a bend radius of the cable 300. The cable measuring tool 200H is selected from the cable measuring tools 200A-200U (FIG. 1) to fit the diameter of the cable 300. In this example, the cable measuring tool 200H is selected because it has the shortest minor axis among the cable measuring tools that can fit the cable 300 within the oblong cutaways of the cable measuring tools. In other words, the minor axis 232 of the oblong cutaway 230 of the cable measuring tool 200H has a specific length, which is about the same as the maximum diameter 302 of the cable 300, or slightly larger. In this example shown in FIG. 2, the maximum diameter 302 of the cable 300 is 7 mm; and thus, the minor axis 232 of the oblong cutaway 230 of the cable measuring tool 200H is about 7 mm, or slightly larger.

Figure 3:
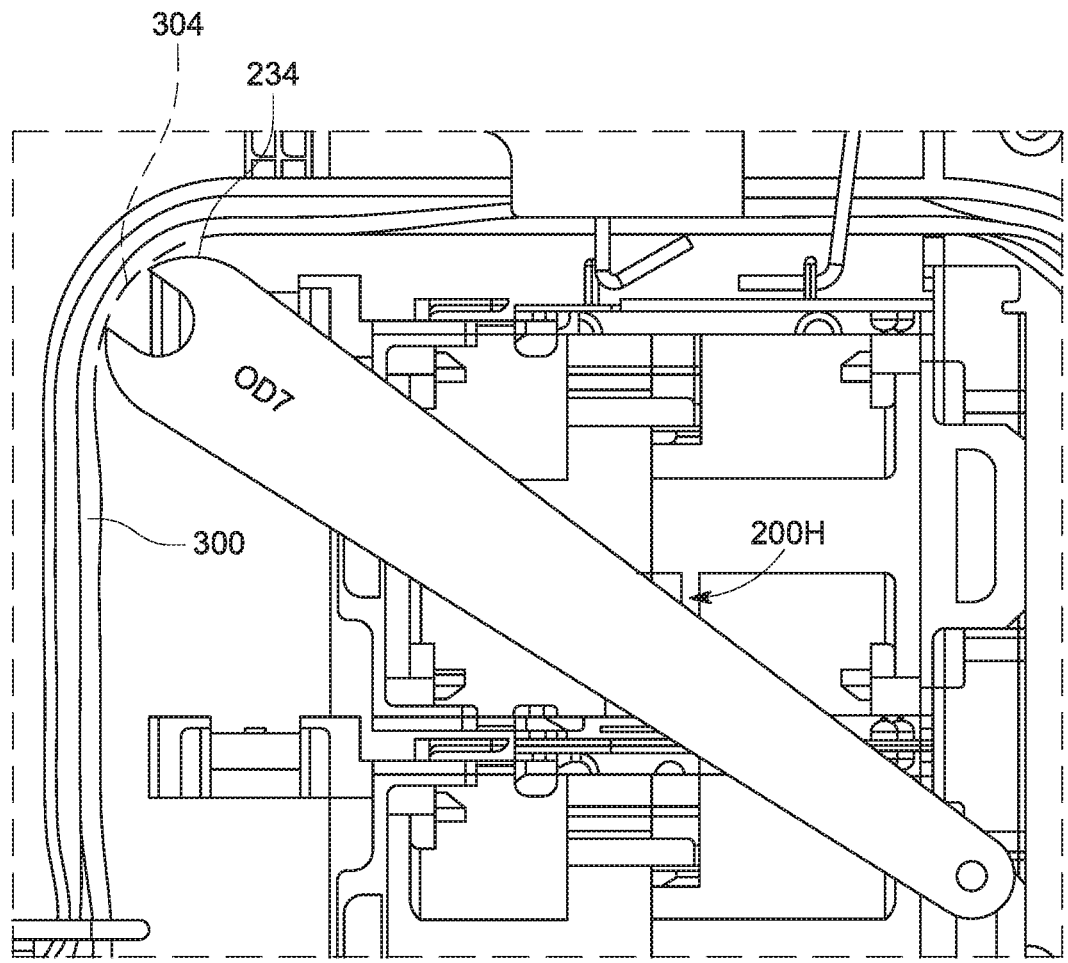
FIG. 3 depicts a compliant cable being measured by the example cable measuring tool of FIG. 2, according to some implementations of the present disclosure.
Figure 4:
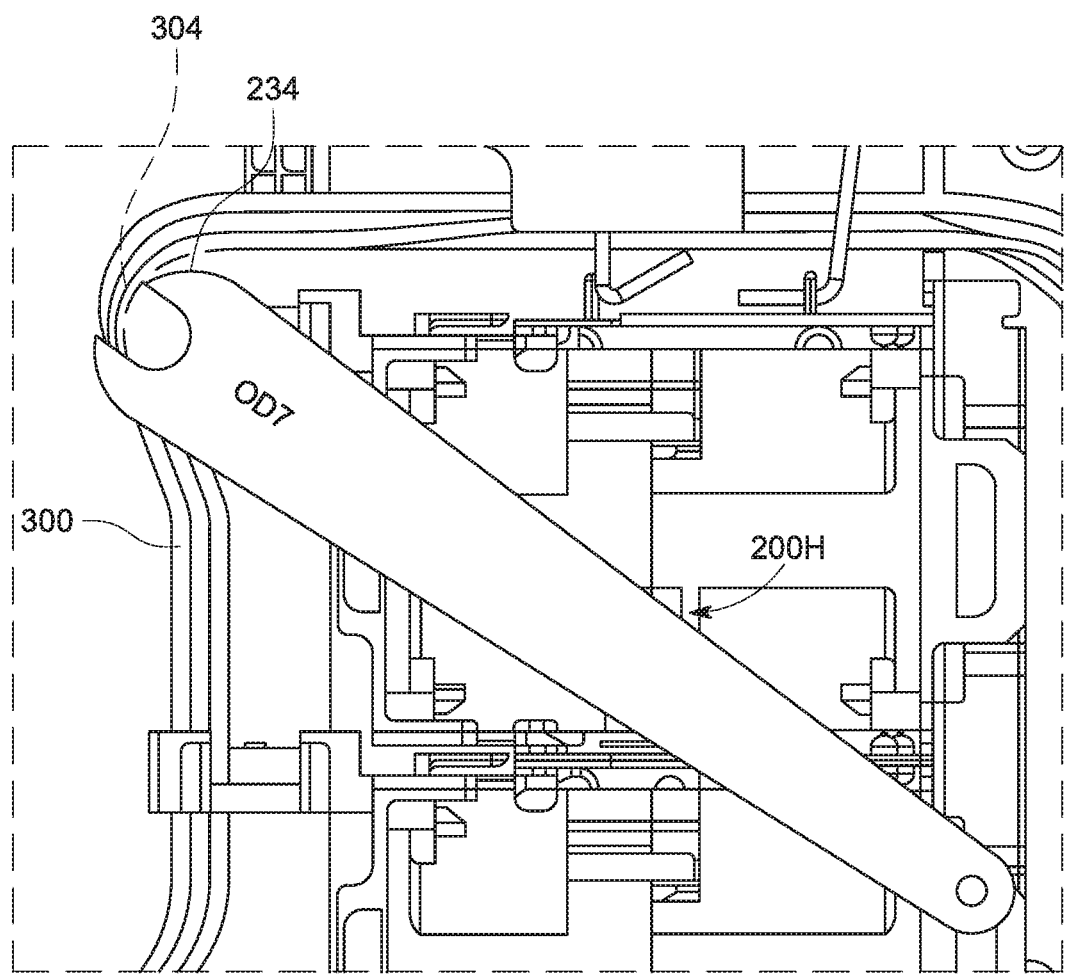
FIG. 4 depicts a non-compliant cable being measured by the example cable measuring tool of FIG. 2, according to some implementations of the present disclosure.

Referring generally to FIGS. 3-4, the first rounded edge 234 of the cable measuring tool 200H is aligned with a bent portion 304 of the cable 300 to continue to verify the bend radius of the cable 300. The radius of the first rounded edge 234 of the cable measuring tool 200H is then compared with the bend radius of the bent portion 304 of the cable 300.

As shown in FIG. 3, the bend radius of the bent portion 304 is determined to have passed verification because the radius of the first rounded edge 234 of the cable measuring tool 200H is greater than the bend radius of the bent portion 304 of the cable 300. Thus, in this example, the bend radius of the bent portion 304 of the cable 300 is compliant with the SOPs.

In contrast, as shown in FIG. 4, the bend radius of the bent portion 304 is determined to have failed verification because the radius of the first rounded edge 234 of the cable measuring tool 200H is less than the bend radius of the bent portion 304 of the cable 300. Thus, in this example, the bend radius of the bent portion 304 of the cable 300 is non-compliant with the SOPs.

One or more elements or aspects or steps, or any portion(s) thereof, from one or more of any of claims 1-20 below can be combined with one or more elements or aspects or steps, or any portion(s) thereof, from one or more of any of the other claims 1-20 or combinations thereof, to form one or more additional implementations and/or claims of the present disclosure.

While various embodiments of the present disclosure have been described above, it should be understood that they have been presented by way of example only, and not limitation. Numerous changes to the disclosed examples can be made in accordance with the disclosure herein without departing from the spirit or scope of the disclosure. Thus, the breadth and scope of the present disclosure should not be limited by any of the above described examples. Rather, the scope of the disclosure should be defined in accordance with the following claims and their equivalents.

Although the disclosed embodiments have been illustrated and described with respect to one or more implementations, equivalent alterations and modifications will occur to others skilled in the art upon the reading and understanding of this specification and the annexed drawings. In addition, while a particular feature of the disclosure may have been disclosed with respect to only one of several implementations, such feature may be combined with one or more other features of the other implementations as may be desired and advantageous for any given or particular application.

The terminology used herein is for the purpose of describing particular examples only and is not intended to be limiting of the disclosure. As used herein, the singular forms "a," "an," and "the" are intended to include the plural forms as well, unless the context clearly indicates otherwise. Furthermore, to the extent that the terms "including," "includes," "having," "has," "with," or variants thereof, are used in either the detailed description and/or the claims, such terms are intended to be inclusive in a manner similar to the term "comprising."

Unless otherwise defined, all terms (including technical and scientific terms) used herein have the same meaning as commonly understood by one of ordinary skill in the art to which this disclosure belongs. Furthermore, terms, such as those defined in commonly used dictionaries, should be interpreted as having a meaning that is consistent with their meaning in the context of the relevant art, and will not be interpreted in an idealized or overly formal sense unless expressly so defined herein.

What is claimed is:

1. A cable measuring tool for measuring cable diameter and bend radius, the cable measuring tool comprising:
   a first end portion including a first rounded edge and a cutaway, the cutaway being configured to fit at least a half of a cable having a maximum diameter, the first rounded edge having a radius that is about 2.5 times that of a minor axis of the cutaway; and
   a second end portion opposite the first end portion and including a second edge, the first rounded edge of the first end portion and the second edge of the second end portion defining a length of the cable measuring tool.

2. The cable measuring tool of claim 1, wherein the cutaway is oblong-shaped.

3. The cable measuring tool of claim 2, wherein the cutaway is shaped as a half ellipse.

4. The cable measuring tool of claim 2, wherein the minor axis of the cutaway has a length about the same as the maximum diameter of the cable.

5. The cable measuring tool of claim 1, wherein the radius of the first rounded edge is between twice and three times the maximum diameter of the cable.

6. The cable measuring tool of claim 1, wherein the radius of the first rounded edge is about 2.5 times that of the maximum diameter of the cable.

7. The cable measuring tool of claim 1, wherein the length of the cable measuring tool is between 15 cm to 16 cm.

8. A tool assembly having a plurality of cable measuring tools for measuring cable diameters and bend radiuses, each cable measuring tool of the plurality of cable measuring tools including:
   a first end portion including a first rounded edge and a cutaway, the cutaway including a minor axis, the first rounded edge having a radius that is greater than a length of the minor axis of the cutaway; and
   a second end portion opposite the first end portion and including a second edge, the first rounded edge of the first end portion and the second edge of the second end portion defining a length of each cable measuring tool.

9. The tool assembly of claim 8, wherein the cutaway of each cable measuring tool is configured to fit at least a half of a cable having a maximum diameter, and wherein the length of the minor axis of the cutaway is about the same as the maximum diameter of the cable.

10. The tool assembly of claim 8, wherein the radius of the first rounded edge of each cable measuring tool is between twice and three times that of the length of the minor axis of the cutaway.

11. The tool assembly of claim 10, wherein the radius of the first rounded edge of each cable measuring tool is about 2.5 times that of the length of the minor axis of the cutaway.

12. The tool assembly of claim 8, wherein the second end portion of each cable measuring tool further includes an aperture, such that the plurality of cable measuring tools is configured to be held together via the aperture of each cable measuring tool.

13. The tool assembly of claim 8, wherein each cable measuring tool of the plurality of cable measuring tools has a different minor axis.

14. The tool assembly of claim 8, wherein the length of the minor axis of a first cable measuring tool of the plurality of cable measuring tools is about 0.5 mm or about 1 mm less than the length of the minor axis of a second cable measuring tool of the plurality of cable measuring tools.

15. The tool assembly of claim 14, wherein the length of the minor axis of the first cable measuring tool of the plurality of cable measuring tools is about 3.5 mm, 4 mm, 4.5 mm, 5 mm, 6.5 mm, 7 mm, 7.5 mm, 8 mm, 8.5 mm, 9 mm, 9.5 mm, 10 mm, 10.5 mm, 11 mm, 12 mm, 13 mm, 14 mm, or 15 mm.

16. The tool assembly of claim 14, wherein the length of the minor axis of the second cable measuring tool of the plurality of cable measuring tools is about 4 mm, 4.5 mm, 5 mm, 6.5 mm, 7 mm, 7.5 mm, 8 mm, 8.5 mm, 9 mm, 9.5 mm, 10 mm, 10.5 mm, 11 mm, 12 mm, 13 mm, 14 mm, 15 mm, or 16 mm.

17. A method for verifying a bend radius of a cable using a plurality of cable measuring tools, each cable measuring tool of the plurality of cable measuring tools including a first end portion having a rounded edge and a cutaway, the cutaway including a minor axis, the rounded edge having a radius that is greater than a length of the minor axis of the cutaway, each minor axis of the cutaway of the plurality of cable measuring tools having a different length, the method comprising:
   selecting a first cable measuring tool from the plurality of cable measuring tools that fits at least half of the cable within the cutaway of the first cable measuring tool;
   aligning the rounded edge of the first cable measuring tool with a bent portion of the cable; and
   comparing the radius of the rounded edge of the first cable measuring tool with the bend radius of the bent portion of the cable.

18. The method of claim 17, further comprising:
   determining that the bend radius has passed verification if the radius of the rounded edge of the first cable measuring tool is greater than the bend radius of the bent portion of the cable.

19. The method of claim 17, further comprising:
   determining that the bend radius has failed verification if the radius of the rounded edge of the first cable measuring tool is less than the bend radius of the bent portion of the cable.

20. The method of claim 17, wherein the first cable measuring tool has the shortest minor axis among one or more cable measuring tools of the plurality cable measuring tools, and wherein each of the one or more cable measuring tools fits the at least half of the cable within the corresponding cutaway of the each of the one or more cable measuring tools.

* * * * *